(12) United States Patent
Myllymäki et al.

(10) Patent No.: US 12,469,111 B2
(45) Date of Patent: Nov. 11, 2025

(54) METHOD AND SYSTEM FOR USING MULTI-SENSOR CONSENSUS TO FILTER-OUT ARTIFACTS FROM POINT CLOUD DATA

(71) Applicant: Unikie Oy, Tampere (FI)

(72) Inventors: Ossi Myllymäki, Turku (FI); Lasse Toimela, Helsinki (FI)

(73) Assignee: Unikie Oy, Tampere (FI)

( * ) Notice: Subject to any disclaimer, the term of this patent is extended or adjusted under 35 U.S.C. 154(b) by 372 days.

(21) Appl. No.: 18/194,728

(22) Filed: Apr. 3, 2023

(65) Prior Publication Data

US 2024/0331095 A1 Oct. 3, 2024

(51) Int. Cl.
*G06T 5/50* (2006.01)
*G06T 5/20* (2006.01)
*G06T 7/00* (2017.01)
*G06T 7/60* (2017.01)

(52) U.S. Cl.
CPC .............. *G06T 5/50* (2013.01); *G06T 5/20* (2013.01); *G06T 7/0002* (2013.01); *G06T 7/60* (2013.01); *G06T 2207/10028* (2013.01); *G06T 2207/20221* (2013.01); *G06T 2207/30168* (2013.01); *G06T 2207/30244* (2013.01)

(58) Field of Classification Search
CPC .......... G06T 5/50; G06T 5/20; G06T 7/0002; G06T 7/60; G06T 2207/10028; G06T 2207/20221; G06T 2207/30168; G06T 2207/30244; G01S 7/4802; G01S 17/89; G06V 20/64
See application file for complete search history.

(56) References Cited

U.S. PATENT DOCUMENTS

2020/0380709 A1* 12/2020 Ben-Lavi ............. G06V 10/255
2021/0089808 A1 3/2021 Yu et al.
2024/0161482 A1* 5/2024 Metzler ................ G06V 10/803

FOREIGN PATENT DOCUMENTS

EP 3969936 A1 3/2022
WO 2021004626 A1 1/2021

OTHER PUBLICATIONS

European Patent Office, Extended European Search Report, Application No. 24164743.7-1206, Dated Sep. 16, 2024, 7 Pages.

* cited by examiner

*Primary Examiner* — Vu Le
*Assistant Examiner* — Rachel Anne Ometz
(74) *Attorney, Agent, or Firm* — ZIEGLER IP LAW GROUP, LLC.

(57) ABSTRACT

A method for using multi-sensor consensus to filter-out artifacts from point cloud data includes receiving point cloud data from plurality of sensors, wherein point cloud data has at least two point clouds; generating fused point cloud by combining at least two point clouds; analyzing fused point cloud for identifying at least one object candidate present in real-world space; determining first set of sensors which actually observe at least one object candidate, based on point cloud data; estimating second set of sensors which are expected to observe at least one object candidate, based on geometry of at least two point clouds and preknown poses of plurality of sensors; and determining whether given cluster including cluster points representing given object candidate is artifact, based on counts of sensors in first set and in second set of sensors.

15 Claims, 10 Drawing Sheets

METHOD AND SYSTEM FOR USING MULTI-SENSOR CONSENSUS TO FILTER-OUT ARTIFACTS FROM POINT CLOUD DATA

TECHNICAL FIELD

The present disclosure relates to methods for using multi-sensor consensus to filter-out artifacts from point cloud data. The present disclosure also relates to systems for using multi-sensor consensus to filter-out artifacts from point cloud data. The present disclosure also relates to computer program products for using multi-sensor consensus to filter-out artifacts from point cloud data.

BACKGROUND

In recent times, various sensor devices are used to produce point cloud data that is indicative of characteristics of real-world environments. A given sensor device could, for example, be a digital camera, a night vision imaging device like Radio Detection and Ranging (Radar), a thermal imaging device, a Sound Navigation and Ranging (Sonar) sensor, a Light Detection and Ranging (Lidar) sensor, and similar. For example, the Lidar can be used in several applications, such as in a wide range of land management and planning efforts (including hazard assessment (including lava flows, landslides, tsunamis, and floods), forestry, agriculture, geologic mapping, watershed and river surveys, and the like), in autonomous vehicles (for collision avoidance, parking assistance, and the like), and similar.

However, data from individual sensors which are typically in the form of point clouds, often exhibit distortions, reflections, and other types of artifacts. For example, it has been found that the performance of Lidars used in autonomous vehicles deteriorates when weather conditions become unfavorable and visibility decreases, especially in low visibility due to snow, fog, rain, or dust. Snow, fog, rain, or dust particles can disturb point clouds and affect Lidar-based map reconstructions and object detection algorithms. Without proper filtering, said artifacts will produce false object detections in Lidar-based perception systems. Typically, the artifacts are a result of the reflections caused by highly reflective objects, like glass, mirrors, and polished metal. In an example, a special reflective coating on glasses in certain type of car models may cause artifacts, thereby limiting the use of automated valet parking (AVP) and/or automated factory parking (AFP) system, the use of automated marshalling system, or the use of automated logistic center and/or automated terminal center associated with the cars or other vehicles. Moreover, said reflections are classified as true objects when processing point cloud data and they can, for example, cause false collision avoidance warnings, thereby causing the car to stop unnecessarily.

Traditionally, point cloud denoising techniques have been used to remove outliers (i.e., erroneous observations indicative of the distortions, reflections, and other types of artifacts) from point clouds in specific cases. These point cloud denoising techniques are typically classified into seven categories such as statistical-based filtering techniques, neighbourhood-based filtering techniques, projection-based filtering approaches, signal processing-based methods, partial differential equations (PDEs)-based filtering techniques, hybrid filtering techniques, and the like. However, such point cloud denoising techniques usually assume presence of only Gaussian noise in the point cloud data and thus are ineffective in removing reflection noise or other types of artifacts with dense and large-scale noise.

In another approach, manufacturers of lidars use simple intensity-based calculation to filter out points that are likely from reflections. However, when intensity-based filtering has been tested in real use cases, it has been observed that it removed true object points and didn't remove all erroneous points from reflections.

Therefore, in light of the foregoing discussion, there exists a need to overcome the aforementioned drawbacks associated with conventional processes of filtering-out artifacts from point cloud data.

SUMMARY

The present disclosure seeks to provide a method for using multi-sensor consensus to filter-out artifacts from point cloud data. The present disclosure also seeks to provide a system for using multi-sensor consensus to filter-out artifacts from point cloud data. The present disclosure also seeks to provide a computer program product for using multi-sensor consensus to filter-out artifacts from point cloud data. An aim of the present disclosure is to provide a solution that overcomes at least partially the problems encountered in prior art.

In a first aspect, an embodiment of the present disclosure provides a method for using multi-sensor consensus to filter-out artifacts from point cloud data, the method comprising:
  receiving the point cloud data from a plurality of sensors, wherein the point cloud data comprises at least two point clouds, and wherein each point cloud is captured from a different pose in a real-world space;
  generating a fused point cloud by combining the at least two point clouds;
  analyzing the fused point cloud for identifying at least one object candidate present in the real-world space;
  determining a first set of sensors which actually observe the at least one object candidate, based on the point cloud data;
  estimating a second set of sensors which are expected to observe the at least one object candidate, based on a geometry of the at least two point clouds and pre-known poses of the plurality of sensors; and
  determining whether a given cluster including cluster points representing a given object candidate is an artifact, based on counts of the sensors in the first set of sensors and the sensors in the second set of sensors.

In a second aspect, an embodiment of the present disclosure provides a system for using multi-sensor consensus to filter-out artifacts from point cloud data, the system comprising:
  a plurality of sensors that, in operation, capture the point cloud data; and
  at least one processor configured to:
  receive the point cloud data from the plurality of sensors, wherein the point cloud data comprises at least two point clouds, and wherein each point cloud is captured from a different pose in a real-world space;
  generate a fused point cloud by combining the at least two point clouds;
  analyze the fused point cloud to identify at least one object candidate present in the real-world space;
  determine a first set of sensors which actually observe the at least one object candidate, based on the point cloud data;

estimate a second set of sensors which are expected to observe the at least one object candidate, based on a geometry of the at least two point clouds and pre-known poses of the plurality of sensors; and determine whether a given cluster including cluster points representing a given object candidate is an artifact, based on counts of the sensors in the first set of sensors and the sensors in the second set of sensors.

In a third aspect, an embodiment of the present disclosure provides a computer program product for using multi-sensor consensus to filter-out artifacts from point cloud data, the computer program product comprising a non-transitory machine-readable data storage medium having stored thereon program instructions that, when accessed by at least one processor, cause the at least one processor to carry out the method of the first aspect.

Embodiments of the present disclosure substantially eliminate or at least partially address the aforementioned problems in the prior art and enable efficient and accurate filtering-out of artifacts from point cloud data using multi-sensor consensus, by employing simple analytical geometry calculations.

Additional aspects, advantages, features, and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1:
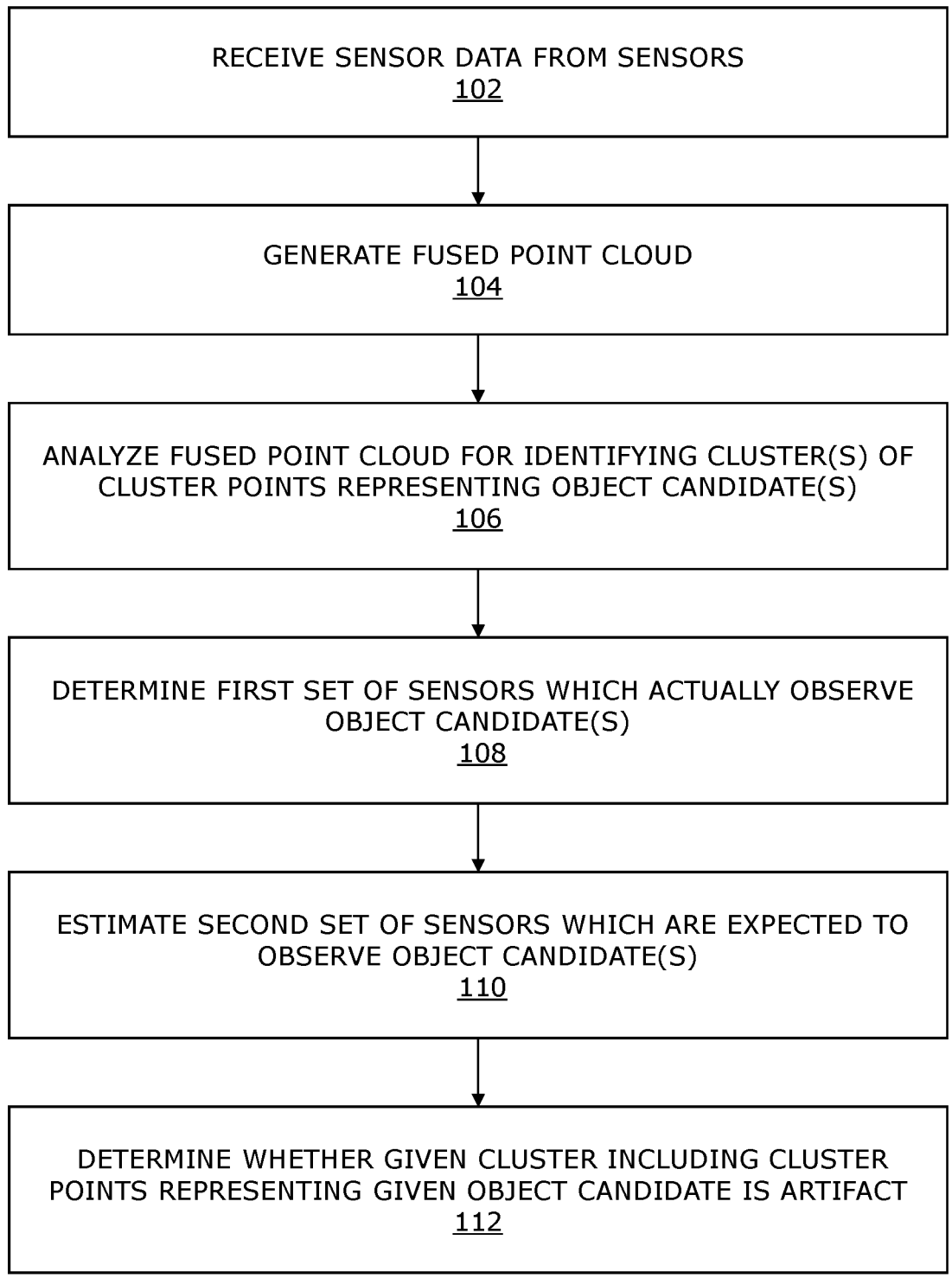
FIG. 1 is a flow chart of steps of a method for using multi-sensor consensus to filter-out artifacts from point cloud data, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a method for using multi-sensor consensus to filter-out artifacts from point cloud data, the method comprising:

receiving the sensor data from a plurality of sensors, wherein the point cloud data comprises at least two point clouds, and wherein each point cloud is captured from a different pose in a real-world space;

generating a fused point cloud by combining the at least two point clouds;

analyzing the fused point cloud for identifying at least one object candidate present in the real-world space;

determining a first set of sensors which actually observe the at least one object candidate, based on the point cloud data;

estimating a second set of sensors which are expected to observe the at least one object candidate, based on a geometry of the at least two point clouds and pre-known poses of the plurality of sensors; and determining whether a given cluster including cluster points representing a given object candidate is an artifact, based on counts of the sensors in the first set of sensors and the sensors in the second set of sensors.

In a second aspect, an embodiment of the present disclosure provides a system for using multi-sensor consensus to filter-out artifacts from point cloud data, the system comprising:

a plurality of sensors that, in operation, capture the point cloud data; and at least one processor configured to:

receive the point cloud data from the plurality of sensors, wherein the point cloud data comprises at least two point clouds, and wherein each point cloud is captured from a different pose in a real-world space;

generate a fused point cloud by combining the at least two point clouds;

analyze the fused point cloud to identify at least one object candidate present in the real-world space;

determine a first set of sensors which actually observe the at least one object candidate, based on the point cloud data;

estimate a second set of sensors which are expected to observe the at least one object candidate, based on a geometry of the at least two point clouds and pre-known poses of the plurality of sensors; and determine whether a given cluster including cluster points representing a given object candidate is an artifact, based on counts of the sensors in the first set of sensors and the sensors in the second set of sensors.

In a third aspect, an embodiment of the present disclosure provides a computer program product for using multi-sensor consensus to filter-out artifacts from point cloud data, the computer program product comprising a non-transitory machine-readable data storage medium having stored thereon program instructions that, when accessed by at least one processor, cause the at least one processor to carry out the method of the first aspect.

The present disclosure provides the aforementioned method, the aforementioned system, and the aforementioned computer program product for using multi-sensor consensus to filter-out artifacts from point cloud data. The method enables accurate identification of artifacts, based on fusion and further processing of the point cloud data obtained from the plurality of sensors. Beneficially, the method employs an intelligent sensor fusion technique that combines information from the plurality of sensors and analyses the combined information (i.e., the fused point cloud) using simple analytical geometry calculations to accurately filter-out the artifacts from the point cloud data. The multi-sensor consensus method is used to enable more accurate artifact filtering as compared to artifact filtering using only a single point cloud. It will be appreciated that the method may also be used for filtering-out artifacts from point cloud data captured by a single sensor, when the point cloud data includes multiple observations over a period of time and an operating environment of the single sensor is a sufficiently static environment. Advantageously, the method is transparent, accurate and is capable of being performed in real-time with a high number of observed objects and a high number of the plurality of sensors.

The term "sensor" refers to a device that senses one or more signals and generates point cloud data based on the one or more signals. The one or more signals may, for example, be one or more light signals, and the point cloud data in such a case may be a point cloud. In this regard, the plurality of sensors is used for generating a point cloud data based on the one or more signals. It will be appreciated that the multi-sensor consensus obtained from the plurality of sensors is used for filtering-out artifacts from point cloud data. Optionally, the plurality of sensors comprise the plurality of Lidar sensors. In this regard, the plurality of Lidar sensors, in operation, emit light beams into the real-world space where they are present, and receive reflections of the light beams off surfaces of objects present in the real-world space. Then, the reflections of the light beams are processed to generate the at least two point clouds. Examples of the plurality of Lidar sensors could be, but are not limited to, airborne Lidars, topographic Lidars, bathymetric Lidars, and terrestrial Lidars. Optionally, the plurality of sensors comprise the plurality of radar sensors. In this regard, the plurality of radar sensors in operation uses radio waves to determine motion and velocity of the object, by figuring out change in a position, a shape, a trajectory, an angle thereof. In this regard, the radar reflections from a plurality of transmitters of the plurality of radar sensors reflect off the object and return to a plurality of receivers of the plurality of radar sensors, giving information about the object's location and velocity.

Pursuant to the embodiments of the present disclosure, the method comprises receiving the point cloud data from the plurality of sensors. The point cloud data is an output generated by the plurality of sensors that detect and respond to sensed signals from the real-world space. Optionally, upon the filtering-out of the artifacts present therein, the point cloud data is used to provide information or serves as an input to another system or device, or to guide a process, or similar. Moreover, the point cloud data comprises the at least two point clouds. In this regard, a given sensor generates at least one point cloud. The term "point cloud" refers to a set of data points in a three-dimensional space, wherein the data points represent the 3D space. Moreover, a position of each data point in the set of data points constituting the point cloud is represented using a coordinate system (for example, using an x, y, and z cartesian coordinate system). Notably, the presence of the at least two point clouds in the point cloud data means that the real-world space is observed by the plurality of sensors, and this enables the method in ensuring that only when the at least one object candidate is observed by two or more sensors from amongst the plurality of sensors, it is indicated that the at least one object candidate is real. The term "object candidate" refers to a visual entity that is represented in the point cloud data and is under observation, wherein said visual entity could in reality be a real object present in the real-world space or be the artifact. Optionally, prior to the step of receiving the at least two point clouds, the method further comprises controlling the plurality of sensors to generate (i.e., capture) the at least two point clouds. Optionally, in this regard, the plurality of sensors is controlled to generate the at least two point clouds simultaneously.

Notably, each point cloud is captured from a different pose in the real-world space. The plurality of sensors are arranged at different poses in the real-world space. The "pose" of the plurality of sensors refers to a position and/or orientation of the plurality of sensors. The pose of the plurality of sensors is determined with respect to a reference coordinate system of the real-world space. Such determination is made at a time of installation of the plurality of sensors, at a time of controlling the plurality of sensors for generating the point cloud data, or similar. Moreover, knowledge of the poses of the plurality of sensors is crucial since they indicate a perspective from which the plurality of sensors perceive the real-world environment. The poses of the plurality of sensors indicate viewpoints and viewing directions from which the point cloud data is captured. Optionally, the plurality of sensors are calibrated prior to use. The poses of the plurality of sensors may remain constant or may change or get disturbed during operation thereof over a period of time. In a first example, three point clouds may be captured using three sensors from three different poses in the real-world space. Furthermore, the at least two point clouds are preferably captured substantially at the same time, real time, near real time, within few milliseconds, or within few seconds of each other. Optionally, the at least two point clouds are captured simultaneously. Advantageously, the at least two point clouds represent a same environment at a similar time, thereby accurately capturing dynamic objects in the real-world space.

The method comprises generating the fused point cloud by combining the at least two point clouds. The term "fused point cloud" refers to a data structure that is generated by combining (i.e., merging) the at least two point clouds with each other. The fused point cloud represents all data points of each of the at least two point clouds. Data processing techniques for combining the at least two point clouds are well known in the art. Referring to the first example, the fused point cloud may be formed using the three point clouds obtained from the plurality of the sensors. It will be appreciated that the fused point cloud may be generated to facilitate situational awareness of the real-world space which enhances the ability of the at least one processor (which implements the method) to understand and interpret the real-world space accurately.

The method comprises analyzing the fused point cloud for identifying the at least one object candidate present in the real-world space. Optionally, the method comprises analyzing the fused point cloud for identifying the at least one cluster of the cluster points representing the at least one object candidate present in the real-world space. The term "cluster of cluster points" refers to a group of data points that represent a same object candidate. Data points that form a cluster representing an object candidate are known as cluster points of the cluster representing said object candidate. Moreover, each cluster may represent a corresponding object candidate that is present in the real-world space. Optionally, the step of analyzing the fused point cloud for identifying the at least one cluster comprises employing a clustering algorithm. Clustering algorithms are well known in the art. Other data processing techniques that enable analysis of the fused point cloud for identifying the at least one cluster can also be employed in the method.

The method comprises determining the first set of sensors which actually observe the at least one object candidate, based on the point cloud data.

Herein, the first set of sensors comprises one or more sensors from amongst the plurality of sensors. In this regard, a sensor is identified to observe a cluster (and thus, to belong to the first set of sensors) when a number of data points (in a point cloud of the sensor) from that sensor is equal to or greater than a threshold number. In an example, the cluster is observed by a first sensor, a second sensor and a third sensor such that the cluster has two data points from the first sensor, ten data points from the second sensor and seven data points from the third sensor. In such a case, if the threshold number is three data points, then only the second sensor and the third sensor are included in the first set of sensors for the cluster.

The method comprises estimating the second set of sensors which are expected to observe the at least one object candidate, based on the geometry of the at least two point clouds and the pre-known poses of the plurality of sensors. In this regard, the process of estimation includes identification of a set of sensors, from the plurality of sensors, that are expected to observe the at least one object candidate. Such set of sensors are considered as the second set of sensors. Moreover, the second set of sensors are installed at the pre-known poses in such a manner that the at least one object candidate is visible therethrough. Each of the second set of sensors are configured to generate the corresponding point clouds while observing the at least one object candidate. Optionally, the estimation of the second set of sensors is based also on sensor characteristics of the plurality of sensors. Examples of the sensor characteristics include one or more of: a range of the plurality of sensors, a sensitivity of the plurality of sensors. Optionally, the range of the plurality of sensors includes a horizontal and a vertical range. Optionally, during the estimation other parameters such as an occluding object, a local point cloud density, a scan pattern of the second set of sensors and dimensions of the at least one object candidate is also considered.

Optionally, the step of estimating the second set of sensors comprises:

for a given sensor under inspection, performing analytical geometry calculations in respect of a given cluster representing a given object candidate, for identifying presence of one case amongst a plurality of cases that are feasible from a perspective of the given sensor, the plurality of cases being:

one or more data points in a given point cloud received from the given sensor lie behind the given cluster, the given cluster is directly observed, the given cluster is occluded by one or more data points in the given point cloud, the given cluster is outside a range of the given sensor;

determining whether it is expected to observe the given cluster from the perspective of the given sensor, based on the one case that is identified to be present; and determining whether the given sensor is to be included in the second set of sensors, based on the determination of whether it is expected to observe the given cluster from the perspective of the given sensor.

In this regard, the given sensor is a sensor that is under inspection for estimating whether said sensor is expected to observe the given object candidate present in the real-world space or not. Herein, the given point cloud refers to an individual point cloud that is obtained from the given sensor under inspection. Optionally, it is determined that it is expected to observe the given cluster from the perspective of the given sensor when the one case that is identified to be present is: the one or more data points in the given point cloud received from the given sensor lie behind the given cluster, or the given cluster is directly observed. In this regard, when the one or more data points in the given point cloud received from the given sensor lie behind the given cluster, it indicates that the given object candidate is not observed directly but the given sensor observes something behind the given object candidate, and thus the given cluster is expected to be observed from the perspective of the given sensor. In another implementation, during the second case the given cluster is observed directly by the given sensor. It indicates that the given object candidate which is a real object in the real-world space is directly observed by the given sensor. In other cases, such as when the given cluster is occluded by one or more data points in the given point cloud or when the given cluster is outside the range of the given sensor, the given cluster lie outside a viewing angle corresponding to a perspective of the given sensor. In such cases, it is not expected to observe the given cluster from the perspective of the given sensor. Optionally, the given cluster is selected to be a cluster that is a candidate for false detections. In this regard, the estimation is done only to a subset of clusters that are candidates for false detections. It will be appreciated that the said estimation reduces computational complexity of the method for filtering out the artifacts from the point cloud data.

Optionally, it is determined that given sensor is to be included in the second set of sensors when it is determined that it is expected to observe the given cluster from the perspective of the given sensor. A technical effect of this is that the second set includes only those sensor(s) which actually observe the given cluster or are likely to observe the given cluster, thereby aiding in accurately filtering-out the artefacts in the point cloud data. Optionally, a number of sensors in the second set is same as a number of sensors in the first set. Alternatively, optionally, a number of sensors in the second set is different from a number of sensors in the first set.

Optionally, the step of performing the analytical geometry calculations in respect of the given cluster comprises:
- sampling a plurality of cluster points from the given cluster;
- determining a cluster centroid that is a centroid of the plurality of cluster points;
- creating a plane normal line segment, wherein the plane normal line segment is normal to a plane having the cluster centroid, and wherein the plane normal line segment connects a position of the given sensor to the cluster centroid;
- selecting a set of data points lying in proximity of the given cluster, from the given point cloud, based on an angle of said data points relative to the plane normal line segment;
- projecting the plurality of cluster points and the set of data points onto the plane;
- finding, for every sampled cluster point from the given cluster, a nearest neighbour data point from amongst the set of data points on the projection plane, wherein a sampled cluster point and its corresponding nearest neighbour data point constitute a point pair;
- discarding, from amongst a plurality of point pairs, any point pair that lies at a distance that is greater than a predefined threshold distance from an adjacent point pair; and
- determining distances of the given sensor to point pairs in the plurality of point pairs, wherein said distances are used for identifying the presence of one case amongst the plurality of cases that are feasible from the perspective of the given sensor.

In this regard, the sampling is performed using a sampling algorithm. The sampling algorithm is used to select the plurality of cluster points from the given cluster based on the point cloud data collected therefrom. It will be appreciated that the step of sampling the plurality of cluster points from the given cluster reduces a computational complexity of the method. The cluster centroid is determined using simple, well-known geometry calculations. Then the plane normal line segment is created using coordinate geometry operations, for example, such that the plane normal line segment is perpendicular to the plane having the cluster centroid. Optionally, a data point is selected to belong to the set of data points lying in proximity of the given cluster when the angle of said data point lies within a threshold angular distance from the plane normal line segment. For example, the threshold angular distance in case of AFP and AVP systems lies in a range of −20 degrees to 20 degrees. The selection of the set of data points further reduces the computational complexity associated with the method. When the plurality of cluster points and the set of data points are projected onto the plane, they can be analyzed efficiently and accurately with respect to each other. For every sampled cluster point from the given cluster, its nearest neighbour data point from amongst the set of data points on the projection plane is found using at least one of a geometry calculation, a rule-based algorithm, or similar. The sampled cluster point and its corresponding nearest neighbour data point constitute the point pair, wherein any point pair that lies at the distance that is greater than the predefined threshold distance from its adjacent point pair, is discarded for simplifying the analytical geometry calculations. Optionally, the predefined threshold distance is 0.2 meters for the AFP/AVP systems. The distances of the given sensor to point pairs in the plurality of point pairs is determined in order to accurately identify the presence of one case amongst the four cases that are feasible from the perspective of the given sensor. The distance is, for example, a Euclidean distance, which is simple to calculate. It will be appreciated that based on the one case selected from the four cases, it is concluded that whether the given cluster is/could be observed by the given sensor or not.

The method comprises determining whether the given cluster including the cluster points representing the given object candidate is the artifact, based on the counts of the sensors in the first set of sensors and the sensors in the second set of sensors. Herein, the term "artifact" refers to a visual anomaly in the point cloud data. The artifact does not represent a real-world object in the real-world space but seems to appear like an object, thus its accurate identification and filtering out (i.e., suppression) from the point cloud data is vital. The point cloud data is often used for highly sensitive and critical real-world applications, and it is important that the point cloud data be highly accurate and free from artifacts. The visual anomaly may be introduced in the point cloud data on account of an error in the perception or representation of any information obtained from an involved equipment or technique(s). The counts of the sensors in the first set of sensors and the second set of sensors are used as a consensus-based technique, to accurately determine whether the cluster is an artifact or not. When there is a consensus between the counts of the sensors in the first set of sensors and the second set of sensors, i.e., the counts are equal, the given object candidate is determined to represent a real-world object. Alternatively, when there is no consensus between the counts of the sensors in the first set of sensors and the second set of sensors, i.e., the counts are unequal, the given object candidate is determined to be the artifact.

Optionally, the step of determining whether the given cluster including the cluster points representing the given object candidate is the artifact comprises employing a decision function, wherein an output of the decision function is indicative of whether the given cluster including the cluster points representing the given object candidate is the artifact. In this regard, the term "decision function" is a function which takes a data (such as the counts of the sensors in the first set of sensors and the sensors in the second set of sensors) as an input and gives a decision as an output (indicative of whether the given cluster is the artifact). In this regard, the decision function is a Boolean function. Optionally, a free-form decision function is employed to determine whether the given cluster representing the given object candidate is the artifact or not. In this regard, the decision function may be as follows:
  bool is_artifact=decision_function (n_observed: int, n_expected: int, threshold: float)

An example case of simple decision function could be just n_observed as follows:

```
if n_observed >= threshold
    return false
else:
    return true
```

So, if two or more sensors observe the object candidate, then it is considered as real object and artifact otherwise. This type of simple decision function could be used also with sensors that don't produce point cloud data, e.g., in cameras, as the second set of sensors (estimation requires point cloud data) is not used in this case.

Optionally, the decision function may contain other logic, such as:

```
if (n_observed > 2):
    return false
else if (n_expected < 3):
    return false
else:
    ratio = n_observed / n_expected
    return ratio < threshold.
```

In this regard, the threshold is pre-defined for the system.

It will be appreciated that based on the decision value it is determined whether the one or more object candidates are artifacts or not.

The present disclosure also relates to the system for using multi-sensor consensus to filter-out artifacts from point cloud data as described above. Various embodiments and variants disclosed above, with respect to the aforementioned first aspect, apply mutatis mutandis to the system.

The term "at least one processor" refers to a computational element that is operable to respond to and process instructions. In other words, the processor may refer to one or more individual processors, processing devices and various elements associated with a processing device that may be shared by other processing devices. Such processors, processing devices and elements may be arranged in various architectures for responding to and executing processing steps. It will be appreciated that the system allows the given sensor to appropriately visualize and thereby draw inferences from the fused point cloud to filter-out artifacts from the point cloud data.

The at least one processor is communicably coupled to the plurality of the sensors via a communication network. It will be appreciated that the communication network may be wired, wireless, or a combination thereof. The communication network could be an individual network or a combination of multiple networks. Examples of the communication network may include, but are not limited to one or more of, Internet, a local network (such as, a TCP/IP-based network, an Ethernet-based local area network, an Ethernet-based personal area network, a Wi-Fi network, and the like), Wide Area Networks (WANs), Metropolitan Area Networks (MANs), a telecommunication network, and a short-range radio network (such as Bluetooth®).

Optionally, when estimating the second set of sensors, the at least one processor is configured to:
for a given sensor under inspection, perform analytical geometry calculations in respect of a given cluster representing a given object candidate, to identify presence of one case amongst a plurality of cases that are feasible from a perspective of the given sensor, the plurality of cases being:
   one or more data points in a given point cloud received from the given sensor lie behind the given cluster,
   the given cluster is directly observed,
   the given cluster is occluded by one or more data points in the given point cloud,
   the given cluster is outside a range of the given sensor;
determine whether it is expected to observe the given cluster from the perspective of the given sensor, based on the one case that is identified to be present; and
determine whether the given sensor is to be included in the second set of sensors, based on the determination of whether it is expected to observe the given cluster from the perspective of the given sensor.

Optionally, it is determined that it is expected to observe the given cluster from the perspective of the given sensor when the one case that is identified to be present is: the one or more data points in the given point cloud received from the given sensor lie behind the given cluster, or the given cluster is directly observed.

Optionally, it is determined that given sensor is to be included in the second set of sensors when it is determined that it is expected to observe the given cluster from the perspective of the given sensor.

Optionally, when performing the analytical geometry calculations in respect of the given cluster, the at least one processor is configured to:
   sample a plurality of cluster points from the given cluster;
   determine a cluster centroid that is a centroid of the plurality of cluster points;
   create a plane normal line segment, wherein the plane normal line segment is normal to a plane having the cluster centroid, and wherein the plane normal line segment connects a position of the given sensor to the cluster centroid;
   select a set of data points lying in proximity of the given cluster, from the given point cloud, based on an angle of said data points relative to the plane normal line segment;
   project the plurality of cluster points and the set of data points onto the plane;
   find, for every sampled cluster point from the given cluster, a nearest neighbour data point from amongst the set of data points on the projection plane, wherein a sampled cluster point and its corresponding nearest neighbour data point constitute a point pair;
   discard, from amongst a plurality of point pairs, any point pair that lies at a distance that is greater than a pre-defined threshold distance from an adjacent point pair; and
   determine distances of the given sensor to point pairs in the plurality of point pairs, wherein said distances are used to identify the presence of one case amongst the plurality of cases that are feasible from the perspective of the given sensor.

Optionally, when determining whether the given cluster including the cluster points representing the given object candidate is the artifact, the at least one processor is configured to employ a decision function, wherein an output of the decision function is indicative of whether the given cluster including the cluster points representing the given object candidate is the artifact.

The present disclosure also relates to the computer program product for using multi-sensor consensus to filter-out artifacts from point cloud data as described above. Various embodiments and variants disclosed above, with respect to the aforementioned first aspect and the second aspect, apply mutatis mutandis to the computer program product.

The term "computer program product" refers to a software product comprising program instructions that are recorded on the non-transitory machine-readable data storage medium, wherein the software product is executable upon a computing hardware for implementing the aforementioned steps of the method for using multi-sensor consensus to filter-out artifacts from point cloud data.

In an embodiment, the non-transitory machine-readable date storage medium can direct a machine (such as the at least one processor, a computer, other programmable data processing apparatus, or other devices) to function in a particular manner, such that the program instructions stored in the non-transitory machine-readable data storage medium cause a series of steps to implement the function specified in a flowchart corresponding to the instructions. Examples of the non-transitory machine-readable data storage medium includes, but is not limited to, an electronic storage device, a magnetic storage device, an optical storage device, an electromagnetic storage device, a semiconductor storage device, a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, or any suitable combination thereof.

DETAILED DESCRIPTION OF DRAWINGS

Referring to FIG. 1, illustrated is a flow chart of steps of a method for using multi-sensor consensus to filter-out artifacts from point cloud data, in accordance with an embodiment of the present disclosure. At step 102, the point cloud data is received from a plurality of sensors, wherein the point cloud data comprises at least two point clouds, and wherein each point cloud is captured from a different pose in a real-world space. At step 104, a fused point cloud is generated by combining the at least two point clouds. At step 106, the fused point cloud is analyzed for identifying at least one object candidate present in the real-world space. At step 108, a first set of sensors which actually observe the at least one object candidate, is determined based on the point cloud data. At step 110, a second set of sensors which are expected to observe the at least one object candidate, is estimated based on a geometry of the at least two point clouds and pre-known poses of the plurality of sensors. At step 112, it is determined whether a given cluster including cluster points representing a given object candidate is an artifact, based on counts of the sensors in the first set of sensors and the sensors in the second set of sensors.

The aforementioned steps are only illustrative and other alternatives can also be provided where one or more steps are added, one or more steps are removed, or one or more steps are provided in a different sequence without departing from the scope of the claims herein.

Figure 2:
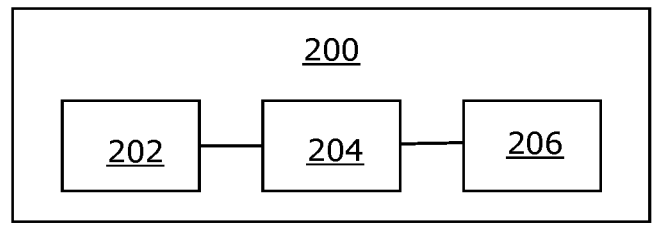
FIG. 2 is a block diagram of architecture of a system for using multi-sensor consensus to filter-out artifacts from point cloud data, in accordance with an embodiment of the present disclosure.

Referring to FIG. 2, illustrated is a block diagram of architecture of a system 200 for using multi-sensor consensus to filter-out artifacts from point cloud data, in accordance with an embodiment of the present disclosure. The system 200 comprises a plurality of sensors (depicted as sensors 202 and 204) and at least one processor (depicted as a processor 206). The processor 206 is communicably coupled to the sensors 202 and 204.

FIG. 2 is merely an example, which should not unduly limit the scope of the claims herein. A person skilled in the art will recognize many variations, alternatives, and modifications of embodiments of the present disclosure.

Figure 3A:
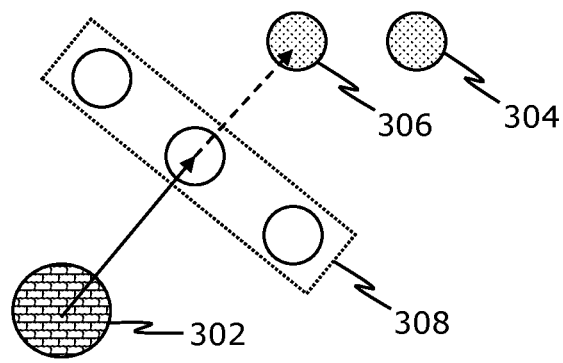
FIGS. 3A and 3B are exemplary scenarios corresponding to a case that is feasible from a perspective of a given sensor, in accordance with an embodiment of the present disclosure.
Figure 3B:
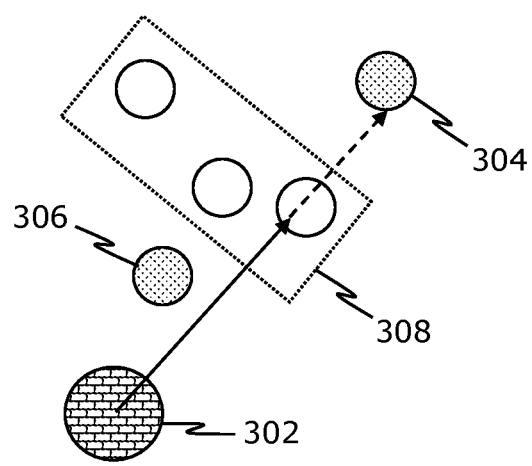

Referring to FIGS. 3A and 3B, illustrated are exemplary scenarios corresponding to a case that is feasible from a perspective of a given sensor (depicted as a brick-hatched sensor 302), in accordance with an embodiment of the present invention. The different scenarios shown in FIGS. 3A and 3B correspond to the case wherein one or more data points (depicted as dotted-hatched data points 304 and 306) in a given point cloud received from the given sensor 302 lie behind a given cluster 308 representing a given object candidate. In FIG. 3A, both the data points 304 and 306 are shown to lie behind the given cluster 308. In FIG. 3B, the data point 304 is shown to lie behind the given cluster 308 whereas the data point 306 is shown to lie in front of the given cluster 308.

Figure 4A:
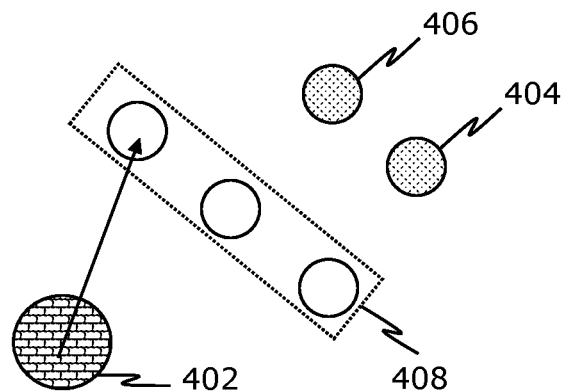
FIGS. 4A and 4B are exemplary scenarios corresponding to another case that is feasible from a perspective of a given sensor, in accordance with an embodiment of the present disclosure.
Figure 4B:
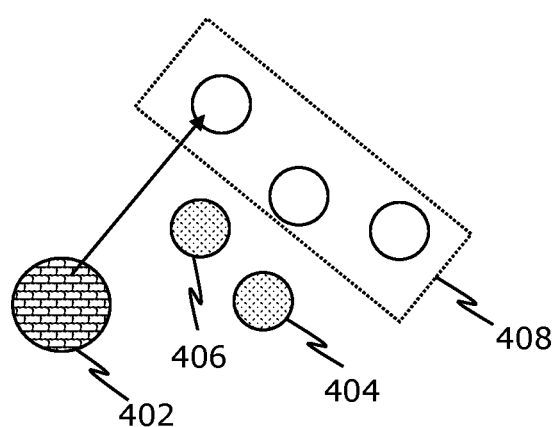

Referring to FIGS. 4A and 4B, illustrated are exemplary scenarios corresponding to another case that is feasible from a perspective of a given sensor 402, in accordance with an embodiment of the present invention. As shown in FIG. 4A, one or more data points such as 404 and 406 and a given cluster 408 are observed from the perspective of the given sensor 402. In FIG. 4B the given cluster 408 is directly observed from the perspective of the given sensor.

Figure 5A:
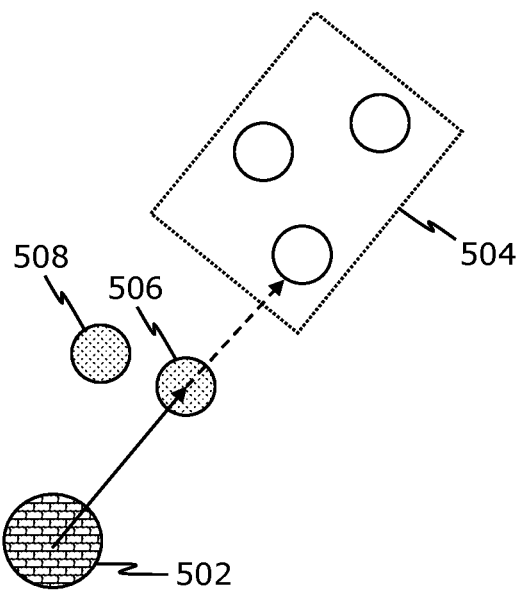
FIGS. 5A and 5B are exemplary scenarios corresponding to yet another case that is feasible from a perspective of a given sensor, in accordance with an embodiment of the present disclosure.
Figure 5B:
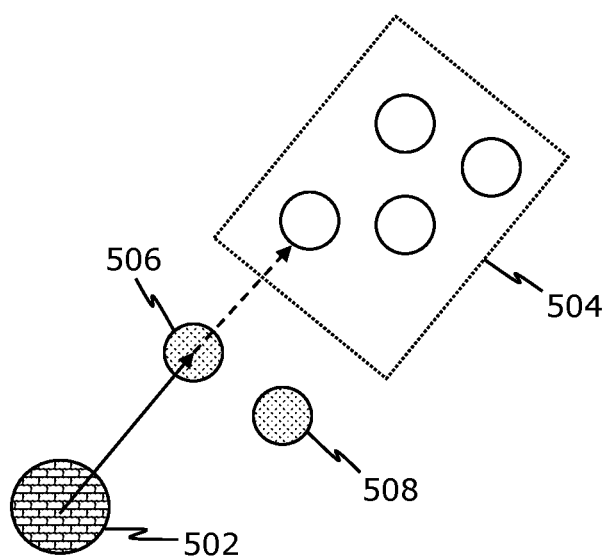

Referring to FIGS. 5A and 5B, illustrated are exemplary scenarios corresponding to yet another case that is feasible from a perspective of a given sensor 502, in accordance with an embodiment of the present invention. As shown in FIGS. 5A and 5B, a given cluster 504 is occluded by one or more data points 506 and 508 in the given point cloud. Therefore, the given cluster 504 is not observed from the perspective of the given sensor 502, thereby indicating that the given sensor 502 is not included in the second set of sensors.

Figure 6A:
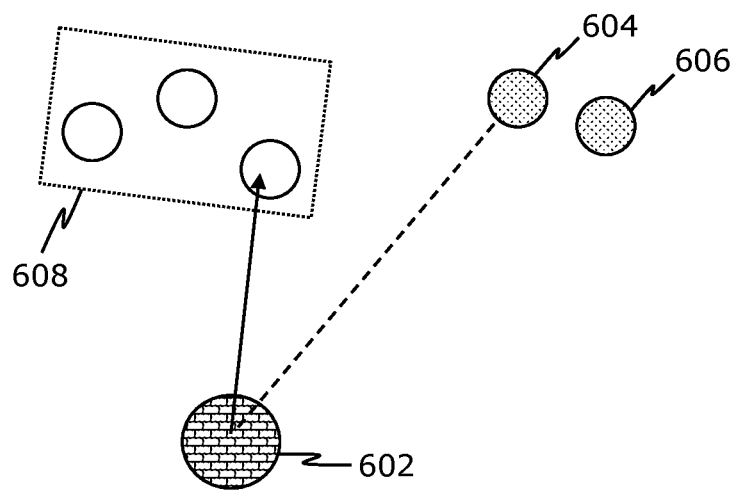
FIGS. 6A and 6B are exemplary scenarios corresponding to still another case that is feasible from a perspective of a given sensor, in accordance with an embodiment of the present disclosure.
Figure 6B:
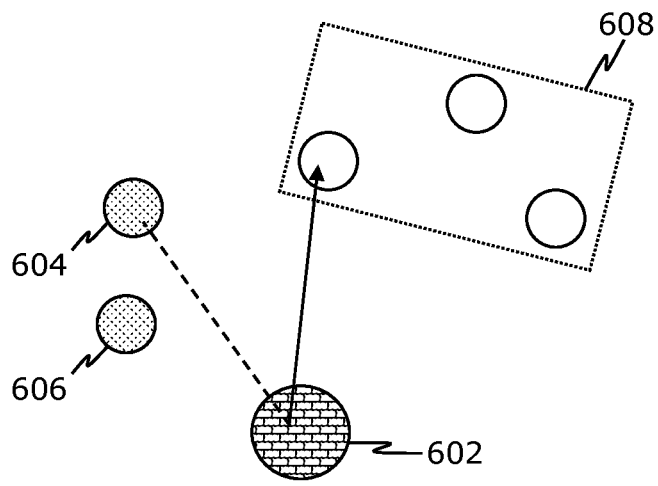

Referring to FIGS. 6A and 6B, illustrated are exemplary scenarios corresponding to still another case that is feasible from a perspective of a given sensor 602, in accordance with an embodiment of the present invention. As shown in FIGS. 6A and 6B, the given sensor 602 is receiving one or more data points such as 604 and 606. As shown, a given cluster 608 is outside a range of the given sensor 602. Therefore, the given cluster 608 is not observed from the perspective of the given sensor 602, thereby indicating that the given sensor 602 is not included in the second set of sensors.

FIGS. 3A, 3B, 4A, 4B, 5A, 5B, 6A, and 6B are merely examples, which should not unduly limit the scope of the claims herein. A person skilled in the art will recognize many variations, alternatives, and modifications of embodiments of the present disclosure.

Referring to FIGS. 7A, 7B, 7C, 7D, 7E, 7F and 7G, illustrated is how analytical geometry calculations are performed in respect of a given cluster representing a given object candidate, in accordance with an embodiment of the present invention. Herein, a given sensor 702 is under inspection. A plurality of cluster points (depicted as cluster points 704A, 704B, 704C and 704D) are sampled from the given cluster. There are also shown one or more data points 706A, 706B and 706C in a given point cloud received from the given sensor 702.

Figure 7A:
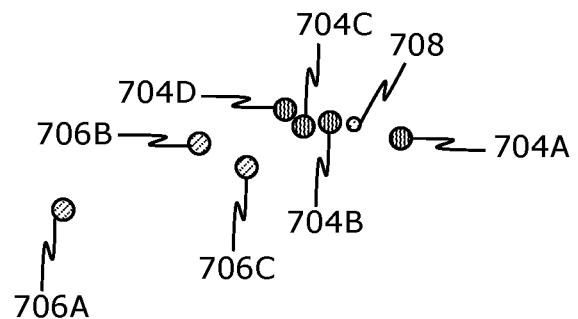
FIGS. 7A, 7B, 7C, 7D, 7E, 7F and 7G illustrate how analytical geometry calculations are performed in respect of a given cluster representing a given object candidate, in accordance with an embodiment of the present disclosure.
Figure 7A:
Figure 7B:
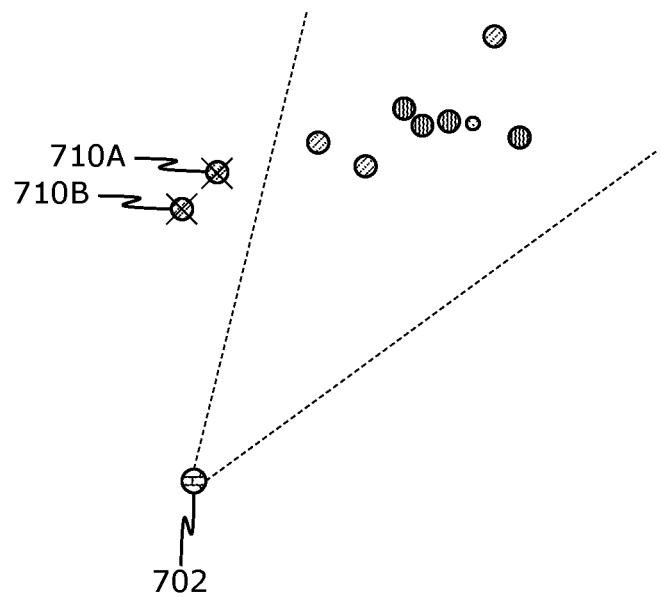

As shown in FIG. 7A, a cluster centroid 708 that is a centroid of the plurality of cluster points 704A, 704B, 704C and 704D is determined. As shown in FIG. 7B, the one or more data points (depicted as data points 710A and 710B) that lie outside a viewing angle corresponding to a perspective of the given sensor 702, are discarded.

Figure 7C:
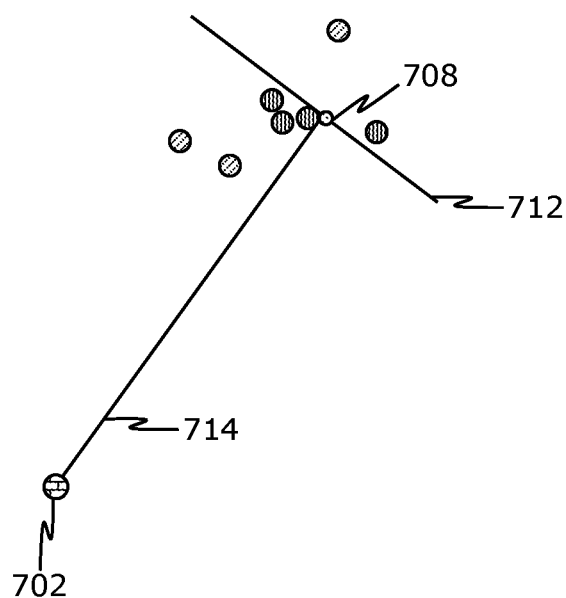

As shown in FIG. 7C, a plane 712 is created which is perpendicular to a plane normal line segment 714. Moreover, the plane normal line segment 714 connects a position of the given sensor 702 to the cluster centroid 708.

Figure 7D:
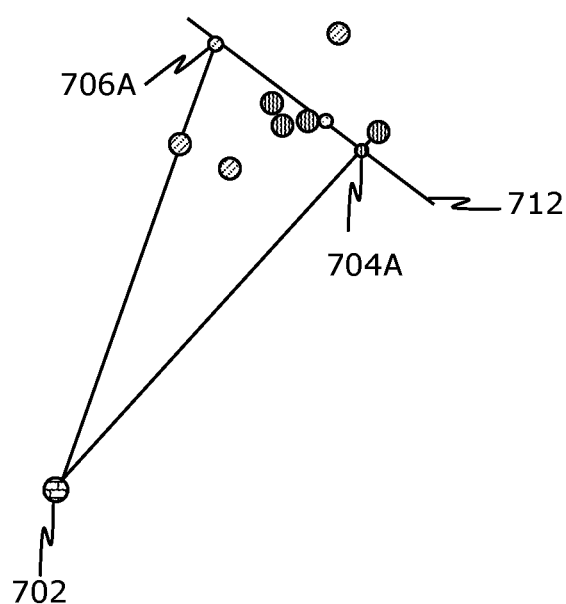

As shown in FIG. 7D, each of the cluster points 704A, 704B, 704C and 704D and the one or more data points 706A, 706B and 706C are projected individually on the plane 712. As shown, a cluster point 704A from the plurality of cluster points 704A, 704B, 704C and 704D and a data point 706A from the one or more data points 706A, 706B and 706C are projected on the plane 712.

Figure 7E:
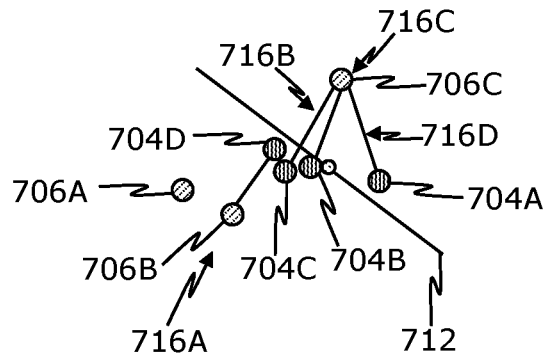

As shown in FIG. 7E, the one or more data points 706A, 706B and 706C that are nearest to the plurality of cluster points 704A, 704B, 704C and 704D on the plane 712 are identified based on a distance on the plane 712. As shown, the data point 706B is nearest to the cluster point 704D, thereby forming a point pair 716A (such as 704D-706B). Moreover, the data point 706C is nearest to the plurality of cluster points 704B and 704C and forms the point pairs 716B (such as 704C-706C) and 716C (such as 704B-706C) on the plane 712. Furthermore, any point pair such as 716D (such as 704A-706C) that lies at a distance that is greater than a predefined threshold distance is discarded as the point pair 716D fails to indicate if there is something in front or behind the cluster point. As shown, the point pair 716D is not relatively close on the plane 712, thereby hindering the visibility analysis.

Figure 7F:
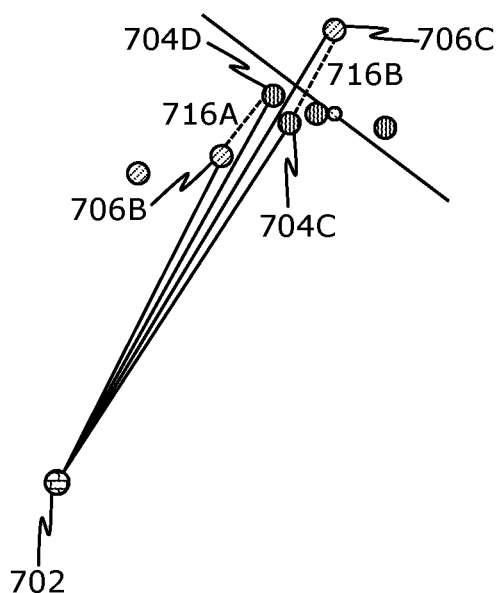

As shown in FIG. 7F, the distance between the given sensor 702 and data point 706B is determined. Moreover, the distance between the given sensor 702 and the cluster point 704D is determined. Furthermore, the distance to the point pair 716A is determined. Similarly, the distance between the given sensor 702 and the cluster point 704C is determined. Furthermore, the distance to the point pair 716B is determined. The distance between the given sensor 702 and the data point 706C is determined. In this manner, the distance to every point pair is determined.

The following describes an example in case of point pair 716A of how the aforementioned calculation is performed. In FIG. 7F, there is a point pair 716A, including points 706B and 704D, as an example. The distance from sensor 702 to point 706B and distance from sensor 702 to point 704D are calculated. This calculation is repeated for every point pair 716A, 716B, 716C. These distances are then used to deduce if there is sensor point behind cluster point or not.

Figure 7G:
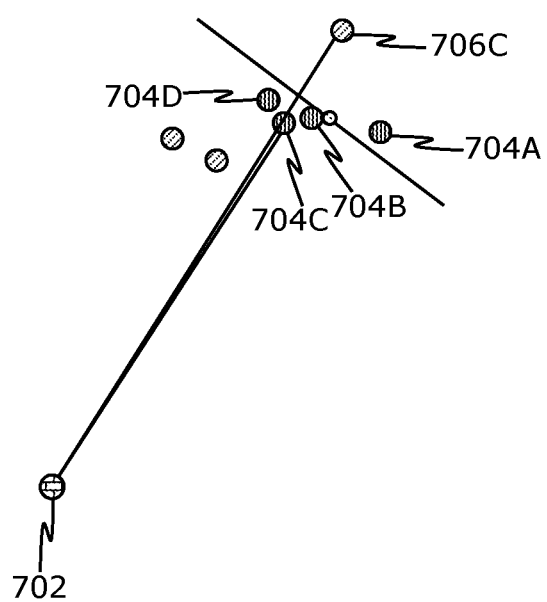

As shown in FIG. 7G, the sensor 702 observes one or more data points behind the cluster, here data point 706C behind the cluster point 704C shown as an example. Thus, the given sensor 702 is expected to observe the cluster and it is included in the second set of sensors for this cluster.

FIGS. 7A, 7B, 7C, 7D, 7E, 7F and 7G illustrate merely an example, which should not unduly limit the scope of the claims herein. A person skilled in the art will recognize many variations, alternatives, and modifications of embodiments of the present disclosure.

Figure 8:
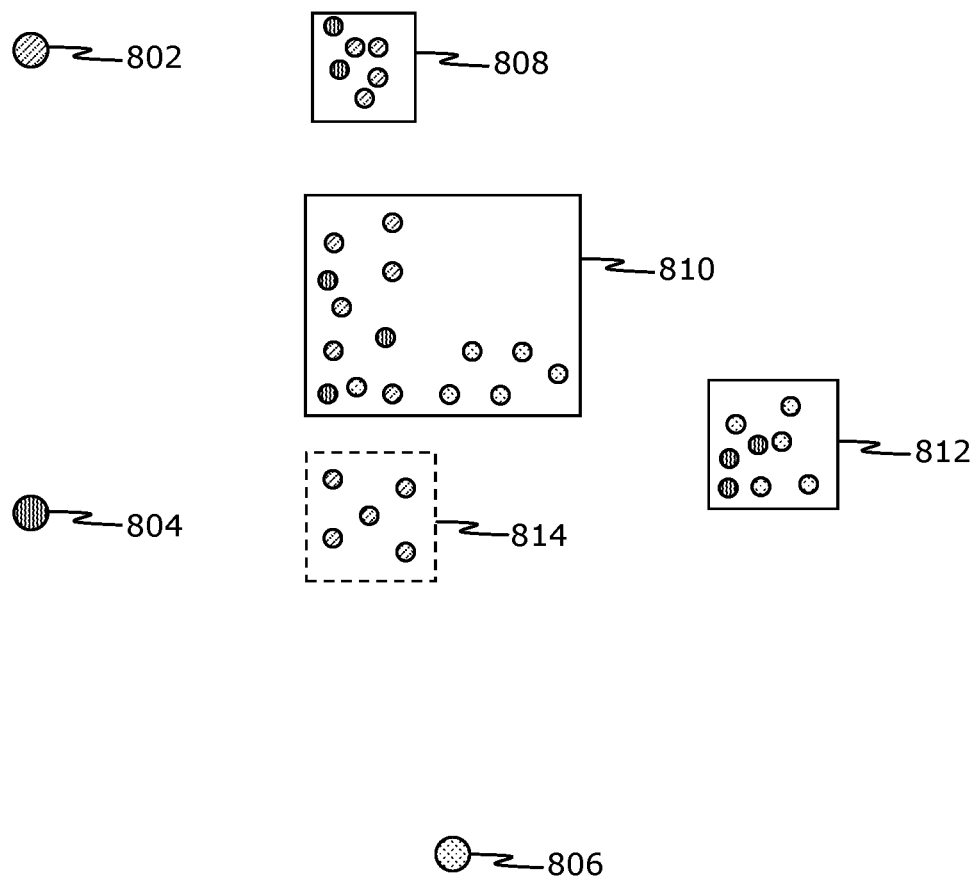
FIG. 8 illustrates a high-level figure showing the filtering-out of artifacts based on counts of a plurality of sensors, in accordance with an embodiment of the present disclosure.

Referring to FIG. 8 illustrated is a high-level figure showing the filtering-out of artifacts based on counts of a plurality of sensors (depicted as 802, 804 and 806), in accordance with an embodiment of the present invention. There is shown a plurality of given object candidates (depicted as 808, 810, 812 and 814. Herein, each of the plurality of sensors 802, 804 and 806 and corresponding cluster points are shown with the same hatching. In a first case, the given object 808 is expected to be observed by the plurality of sensors 802 and 804 and is also observed by the plurality of sensors 802 and 804. In such a case, the observed sensor count (such as two sensors) is equal to the expected sensor count (such as two sensors), thereby indicating that the given object 808 is a real object. In a second case, the given object 810 is expected to be observed by the plurality of sensors 802, 804 and 806 and is also observed by the plurality of sensors 802, 804 and 806. In such a case, the observed sensor count (such as three sensors) is equal to the expected sensor count (such as three sensors), thereby indicating that the given object 810 is another real object. In a third case, the given object 812 is expected to be observed by the plurality of sensors 804 and 806 and is also observed by the plurality of sensors 804 and 806. In such a case, the observed sensor count (such as two sensors) is equal to the expected sensor count (such as two sensors), thereby indicating that the given object 812 is another real object. In a fourth case, the given object 814 is expected to be observed by the sensors 802, 804 and 806. In such case, the sensor 802 observes the cluster point directly. Sensors 804 and 806 observe the data points behind the cluster. Additionally, the observed sensor count (such as one sensor) is unequal to the expected sensor count (such as three sensors), thereby indicating that the given object 814 is the artifact.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A method for using multi-sensor consensus to filter-out artifacts from point cloud data, the method comprising:
   receiving the point cloud data from a plurality of sensors, wherein the point cloud data comprises at least two point clouds, and wherein each point cloud is captured from a different pose in a real-world space;
   generating a fused point cloud by combining the at least two point clouds;
   analyzing the fused point cloud for identifying at least one object candidate present in the real-world space;
   determining a first set of sensors which actually observe the at least one object candidate, based on the point cloud data;
   estimating a second set of sensors which are expected to observe the at least one object candidate, based on a geometry of the at least two point clouds and pre-known poses of the plurality of sensors; and
   determining whether a given cluster including cluster points representing a given object candidate is an artifact, based on counts of the sensors in the first set of sensors and the sensors in the second set of sensors.

2. The method of claim 1, wherein the at least two point clouds are captured simultaneously.

3. The method of claim 1, wherein the step of determining whether the given cluster including the cluster points representing the given object candidate is the artifact comprises employing a decision function, wherein an output of the decision function is indicative of whether the given cluster including the cluster points representing the given object candidate is the artifact.

4. The method of claim 1, wherein the step of estimating the second set of sensors comprises:
   for a given sensor under inspection, performing analytical geometry calculations in respect of a given cluster representing a given object candidate, for identifying presence of one case amongst a plurality of cases that are feasible from a perspective of the given sensor, the plurality of cases being:
   one or more data points in a given point cloud received from the given sensor lie behind the given cluster,
   the given cluster is directly observed,
   the given cluster is occluded by one or more data points in the given point cloud,
   the given cluster is outside a range of the given sensor;
   determining whether it is expected to observe the given cluster from the perspective of the given sensor, based on the one case that is identified to be present; and
   determining whether the given sensor is to be included in the second set of sensors, based on the determination of whether it is expected to observe the given cluster from the perspective of the given sensor.

5. The method of claim 4, wherein it is determined that it is expected to observe the given cluster from the perspective of the given sensor when the one case that is identified to be present is: the one or more data points in the given point cloud received from the given sensor lie behind the given cluster, or the given cluster is directly observed.

6. The method of claim 4, wherein it is determined that given sensor is to be included in the second set of sensors when it is determined that it is expected to observe the given cluster from the perspective of the given sensor.

7. The method of claim 4, wherein the step of performing the analytical geometry calculations in respect of the given cluster comprises:
sampling a plurality of cluster points from the given cluster;
determining a cluster centroid that is a centroid of the plurality of cluster points;
creating a plane normal line segment, wherein the plane normal line segment is normal to a plane having the cluster centroid, and wherein the plane normal line segment connects a position of the given sensor to the cluster centroid;
selecting a set of data points lying in proximity of the given cluster, from the given point cloud, based on an angle of said data points relative to the plane normal line segment;
projecting the plurality of cluster points and the set of data points onto the plane;
finding, for every sampled cluster point from the given cluster, a nearest neighbour data point from amongst the set of data points on the projection plane, wherein a sampled cluster point and its corresponding nearest neighbour data point constitute a point pair;
discarding, from amongst a plurality of point pairs, any point pair that lies at a distance that is greater than a predefined threshold distance, from an adjacent point pair; and
determining distances of the given sensor to point pairs in the plurality of point pairs, wherein said distances are used for identifying the presence of one case amongst the plurality of cases that are feasible from the perspective of the given sensor.

8. The method of claim 4, wherein the given cluster is selected to be a cluster that is a candidate for false detections.

9. A computer program product for using multi-sensor consensus to filter-out artifacts from point cloud data, the computer program product comprising a non-transitory machine-readable data storage medium having stored thereon program instructions that, when accessed by at least one processor, cause the at least one processor to carry out the method of claim 1.

10. A system for using multi-sensor consensus to filter-out artifacts from point cloud data, the system comprising:
a plurality of sensors that, in operation, capture the point cloud data; and
at least one processor configured to:
receive the point cloud data from the plurality of sensors, wherein the point cloud data comprises at least two point clouds, and wherein each point cloud is captured from a different pose in a real-world space;
generate a fused point cloud by combining the at least two point clouds;
analyze the fused point cloud to identify at least one object candidate present in the real-world space;
determine a first set of sensors which actually observe the at least one object candidate, based on the point cloud data;
estimate a second set of sensors which are expected to observe the at least one object candidate, based on a geometry of the at least two point clouds and pre-known poses of the plurality of sensors; and
determine whether a given cluster including cluster points representing a given object candidate is an artifact, based on counts of the sensors in the first set of sensors and the sensors in the second set of sensors.

11. The system of claim 10, wherein when determining whether the given cluster including the cluster points representing the given object candidate is the artifact, the at least one processor is configured to employ a decision function, wherein an output of the decision function is indicative of whether the given cluster including the cluster points representing the given object candidate is the artifact.

12. The system of claim 10, wherein when estimating the second set of sensors, the at least one processor is configured to:
for a given sensor under inspection, perform analytical geometry calculations in respect of a given cluster representing a given object candidate, to identify presence of one case amongst a plurality of cases that are feasible from a perspective of the given sensor, the plurality of cases being:
one or more data points in a given point cloud received from the given sensor lie behind the given cluster,
the given cluster is directly observed,
the given cluster is occluded by one or more data points in the given point cloud,
the given cluster is outside a range of the given sensor;
determine whether it is expected to observe the given cluster from the perspective of the given sensor, based on the one case that is identified to be present; and
determine whether the given sensor is to be included in the second set of sensors, based on the determination of whether it is expected to observe the given cluster from the perspective of the given sensor.

13. The system of claim 12, wherein it is determined that it is expected to observe the given cluster from the perspective of the given sensor when the one case that is identified to be present is: the one or more data points in the given point cloud received from the given sensor lie behind the given cluster, or the given cluster is directly observed.

14. The system of claim 12, wherein it is determined that given sensor is to be included in the second set of sensors when it is determined that it is expected to observe the given cluster from the perspective of the given sensor.

15. The system of claim 12, wherein when performing the analytical geometry calculations in respect of the given cluster, the at least one processor is configured to:
sample a plurality of cluster points from the given cluster;
determine a cluster centroid that is a centroid of the plurality of cluster points;
create a plane normal line segment, wherein the plane normal vector is normal to a plane having the cluster centroid, and wherein the plane normal line segment connects a position of the given sensor to the cluster centroid;

select a set of data points lying in proximity of the given cluster, from the given point cloud, based on an angle of said data points relative to the plane normal line segment;

project the plurality of cluster points and the set of data points onto the plane;

find, for every sampled cluster point from the given cluster, a nearest neighbour data point from amongst the set of data points on the projection plane, wherein a sampled cluster point and its corresponding nearest neighbour data point constitute a point pair;

discard, from amongst a plurality of point pairs, any point pair that lies at a distance that is greater than a predefined threshold distance, from an adjacent point pair; and determine distances of the given sensor to point pairs in the plurality of point pairs, wherein said distances are used to identify the presence of one case amongst the plurality of cases that are feasible from the perspective of the given sensor.

* * * * *